(12) United States Patent
Inaba et al.

(10) Patent No.: US 8,827,588 B2
(45) Date of Patent: Sep. 9, 2014

(54) FASTENING STRUCTURE OF RESIN MEMBER

(75) Inventors: Hirotaka Inaba, Kariya (JP); Shinichi Morita, Kariya (JP)

(73) Assignees: Kabushiki Kaisha Toyota Jidoshokki, Aichi-ken (JP); Toyota Jidosha Kabushiki Kaisha, Aichi-ken (JP); Toyota Shatai Kabushiki Kaisha, Aichi-ken (JP)

( * ) Notice: Subject to any disclaimer, the term of this patent is extended or adjusted under 35 U.S.C. 154(b) by 163 days.

(21) Appl. No.: 13/256,857

(22) PCT Filed: Jan. 28, 2010

(86) PCT No.: PCT/JP2010/051093
§ 371 (c)(1),
(2), (4) Date: Sep. 15, 2011

(87) PCT Pub. No.: WO2010/125837
PCT Pub. Date: Nov. 4, 2010

(65) Prior Publication Data
US 2012/0003034 A1   Jan. 5, 2012

(30) Foreign Application Priority Data
Apr. 28, 2009   (JP) ................. 2009-109423

(51) Int. Cl.
*F16B 43/00*   (2006.01)
*B62D 25/06*   (2006.01)
*F16B 5/06*   (2006.01)
*B60J 7/00*   (2006.01)
*B62D 29/04*   (2006.01)

(52) U.S. Cl.
CPC .............. *F16B 5/0657* (2013.01); *B62D 25/06* (2013.01); *B60J 7/0015* (2013.01); *B62D 29/048* (2013.01); *F16B 5/065* (2013.01)

USPC .......................... 403/408.1; 411/523; 411/544

(58) Field of Classification Search
CPC ...... F16B 5/0088; F16B 5/0241; F16B 5/025; F16B 43/005
USPC ............... 403/167, 168, 408.1; 411/104, 522, 411/523, 524, 544
See application file for complete search history.

(56) References Cited

U.S. PATENT DOCUMENTS 1,363,789 A * 12/1920 Howarth ................. 184/11.2
1,631,819 A *  6/1927 Ivory .......................... 411/149

(Continued)

FOREIGN PATENT DOCUMENTS

JP    50-18253 Y1    6/1975
JP    62-164282 U   10/1987

(Continued)

OTHER PUBLICATIONS

Translation of International Preliminary Report on Patentability for corresponding International Patent Application No. PCT/JP2010/051093 issued Nov. 22, 2011.

*Primary Examiner* — Michael P Ferguson
(74) *Attorney, Agent, or Firm* — Sughrue Mion, PLLC

(57) ABSTRACT

A fastening structure of a resin roof panel is disclosed for fastening a sunshade housing thereto. The sunshade housing includes an attaching portion. The roof panel includes coupling portions. The attaching portion and the coupling portions are fastened to each other by combined members. Each combined member is formed by combining a fastening bolt and a plate spring, and is inserted in an elongated hole. Each combined member permits the attaching portion and the associated coupling portion to be relatively displaced along the longitudinal direction of the elongated hole, and permits the attaching portion and the associated coupling portion to be relatively displaced along the axial direction of the fastening bolt through elastic deformation of the associated plate spring.

2 Claims, 9 Drawing Sheets

(56) References Cited

U.S. PATENT DOCUMENTS

| | | | |
|---|---|---|---|
| 2,278,708 A | * | 4/1942 | Miller .......................... 411/522 |
| 2,748,906 A | * | 6/1956 | Flora ............................ 411/107 |
| 4,050,771 A | * | 9/1977 | Watson et al. ............. 403/408.1 |
| 4,168,858 A | * | 9/1979 | Inamoto ......................... 296/93 |
| 4,437,784 A | * | 3/1984 | Peterson ................... 403/408.1 |
| 7,905,695 B2 | * | 3/2011 | O Brien et al. ................ 411/544 |

| | | |
|---|---|---|
| 2002/0094414 A1 | 7/2002 | Wagenblast et al. |

FOREIGN PATENT DOCUMENTS

| | | |
|---|---|---|
| JP | 1-95486 U | 6/1989 |
| JP | 4-368249 A | 12/1992 |
| JP | 8-68414 A | 3/1996 |
| JP | 2002-283463 A | 10/2002 |

* cited by examiner

FASTENING STRUCTURE OF RESIN MEMBER

CROSS REFERENCE TO RELATED APPLICATIONS

This application is a National Stage of International Application No. PCT/JP2010/051093 filed Jan. 28, 2010, claiming priority based on Japanese Patent Application No. 2009-109423 filed Apr. 28, 2009, the contents of all of which are incorporated herein by reference in their entirety.

FIELD OF THE INVENTION

The present invention relates to a fastening structure of a resin component that fastens a metal component and a resin component to each other.

BACKGROUND OF THE INVENTION

Patent Document 1 discloses one example of a fastening structure of a resin component that fastens a metal component and a resin component to each other. In the fastening structure disclosed in Patent Document 1, a box portion is formed on a back surface of a resin component, which is a side cover in this publication. A retainer plate to which a nut is secured is attached to the box portion. An engaging piece and a retaining protrusion are formed on the retainer plate. When the retainer plate is inserted into the box portion, the retainer plate is secured to the box portion by the engaging piece and the retaining protrusion. In this state, a fastening bolt is screwed into the nut of the retainer plate via a through hole of the metal component, which is a vehicle body panel in this publication, so that the side cover is fastened to the vehicle body panel.

PRIOR ART DOCUMENTS

Patent Document

Patent Document 1: Japanese Laid-Open Patent Publication No. 4-368249

SUMMARY OF THE INVENTION

Problems that the Invention is to Solve

Since the metal component and the resin component has different coefficients of thermal expansion, stress is applied to the fastening portion between the metal component and the resin component when the temperature changes due to the difference between the thermal expansion and contraction of the metal component and that of the resin component. This may cause damage to the fastening portion. The hole through which the fastening bolt is inserted at the fastening portion between the metal component and the resin component may therefore be formed as an elongated hole so that the thermal expansion and contraction of the resin component is absorbed. However, if the resin component is, for example, a resin roof panel (panoramic roof panel) of the vehicle, the resin component is displaced in one direction (that is, the surface direction of the resin roof panel) and is also displaced in the inclination direction with respect to the resin component due to thermal expansion and contraction. Therefore, even if the hole through which the fastening bolt is inserted is formed as an elongated hole, thermal expansion and contraction of the resin component is anticipated to cause stress on the fastening portion between the metal component and the resin component, which may cause damage to the fastening portion.

Accordingly, it is an objective of the present invention to provide a fastening structure of a resin component that reliably absorbs displacement of the resin component in the inclination direction even it the resin component is displaced in the inclination direction due to thermal expansion and contraction, thereby inhibiting stress applied to the fastening portion between the metal component and the resin component, and preventing damage on the fastening portion.

Means for Solving the Problems

To achieve the foregoing objective and in accordance with one aspect of the present invention, a fastening structure of a resin component for fastening a metal component and a resin component to each other is provided. The metal component includes an attaching portion. The resin component includes a coupling portion facing the mounting portion. The mounting portion and the coupling portion are fastened to each other by a combined member. The combined member is formed by combining a fastening member and an elastic member, and is inserted in an elongated hole. The combined member permits relative displacement of the mounting portion and the coupling portion along a longitudinal direction of the elongated hole. The combined member permits relative displacement of the mounting portion and the coupling portion within a predetermined range along an axial direction of the fastening member through elastic deformation of the elastic member. The combined member absorbs displacement of the resin component with respect to the metal component due to thermal expansion and contraction of the resin component.

DETAILED DESCRIPTION OF THE INVENTION

Figure 1:
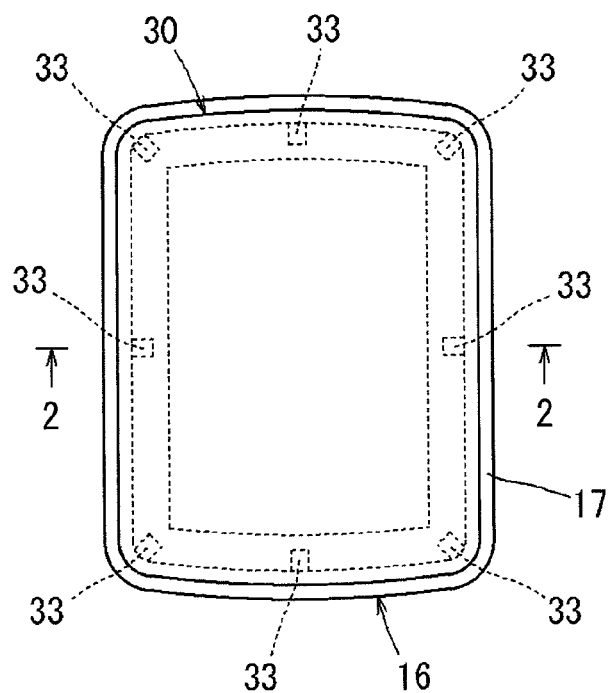
FIG. 1 A plan view illustrating a resin roof panel according to a first embodiment of the present invention.
Figure 2:
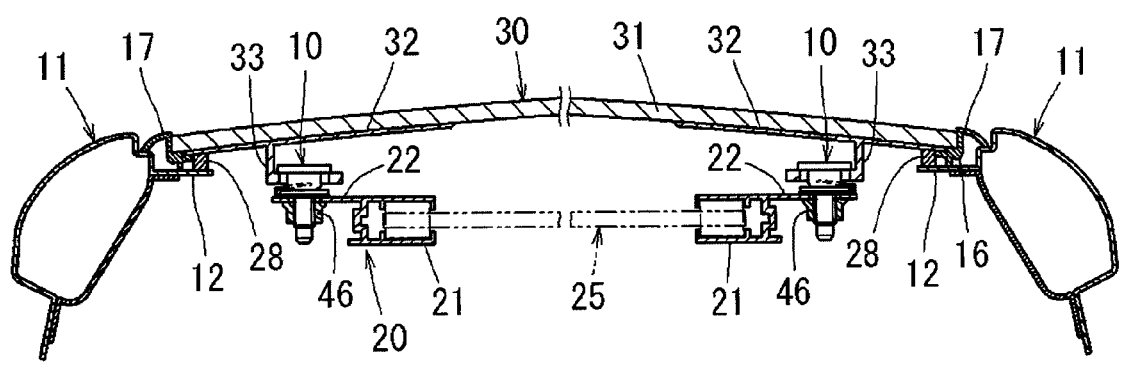
FIG. 2 A cross-sectional view taken along line 2-2 in FIG. 1.

A fastening structure of a resin component according to a first embodiment of the present invention will now be described with reference to FIGS. 1 to 5. In the first embodiment, a metal component corresponds to a sunshade housing 20 arranged on a ceiling forming a passenger compartment, and a resin component corresponds to a resin roof panel (panoramic roof) 30. As shown in FIGS. 1 and 2, a window opening portion is formed in the ceiling of the vehicle body. The window opening portion is surrounded by a roof rail panel 11, which extends in the fore-and-aft direction and the left-and-right direction of the vehicle. The resin roof panel 30 is mounted on the window opening portion to seal the window opening portion. In the passenger compartment, the sunshade housing 20 located below the resin roof panel 30 is suspended from the resin roof panel 30. The fastening structure of a resin component according to the first embodiment is a fastening structure of a fastening for the sunshade housing 20 in a suspended state below the resin roof panel 30.

Figure 3:
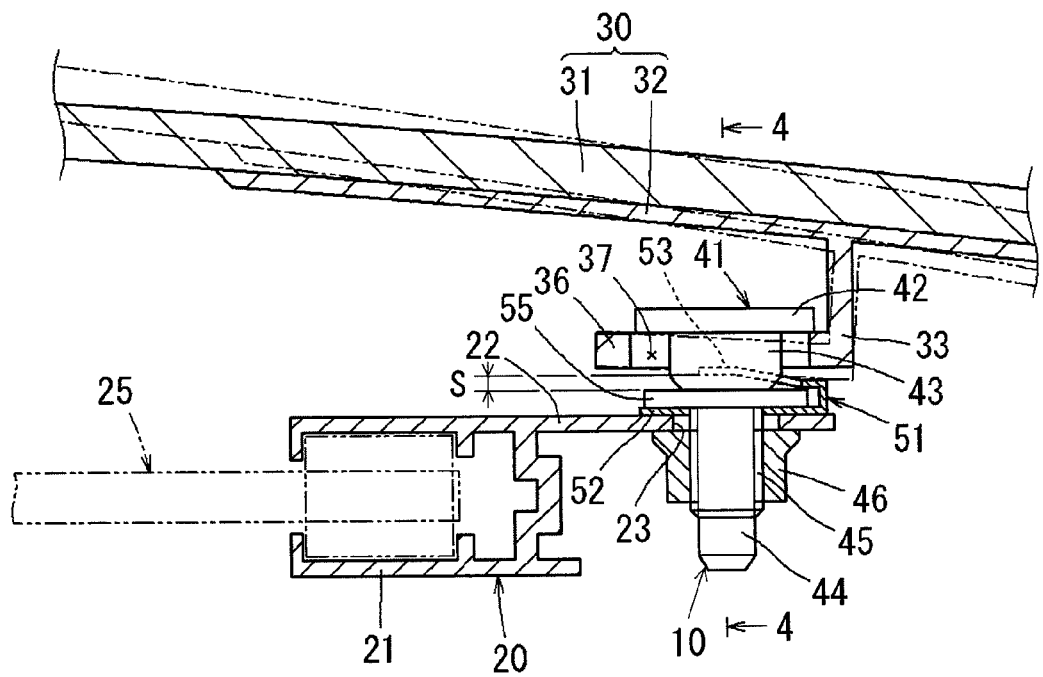
FIG. 3 A cross-sectional view illustrating the state in which the resin roof panel is fastened to the sunshade housing by a fastening belt.

As shown in FIGS. 2 and 3, the sunshade housing 20 is formed by four frame members extending in the fore-and-aft directions and the left-and-right directions of the vehicle. The frame members are made of metal such as an aluminum alloy by extrusion molding. Each frame member has a required shape in the transverse cross-sectional view. The sunshade housing 20 is formed by assembling the four frame members to form a rectangular frame. In the sunshade housing 20, rail portions 21 are formed on two frame members extending in the vehicle fore-and-aft direction on both sides of the vehicle in the vehicle-widthwise direction such that the rail portions 21 face each other. Flange-like attaching portions 22 are integrally formed on the above-mentioned two frame members to extend in the opposite directions from each other. In the sunshade housing 20, similar flange-like attaching portions are also formed in two frame members extending in the vehicle-widthwise direction on both sides of the vehicle in the vehicle fore-and-aft direction. A sunshade 25 is provided to be slidable in the vehicle fore-and-aft directions along the rail portions 21 of the two frames of the sunshade housing 20 extending in the vehicle fore-and-aft direction. As is known, the sunshade 25 blocks light that enters through the resin roof panel 30.

As shown in FIG. 2, the resin roof panel 30 integrally includes a main body, which is a panel portion 31 in the first embodiment, and a looped peripheral frame portion 32, which extends along the periphery of the lower surface of the panel portion 31. The panel portion 31 is formed of transparent resin material, and the peripheral frame portion 32 is formed of opaque resin material. That is, the roof panel 30 is formed of two different kinds of materials by two-color molding. Also, the lower surface of the panel portion 31 of the resin roof panel 33 in the vicinity of the peripheral portion is secured to a joint flange 12 of the roof rail panel 11 by, for example, an adhesive 28. A roof molding 16 formed of an elastic body such as soft resin and rubber is attached to the outer circumferential edge of the panel portion 31. A seal lip 17 extends outward from the periphery of the roof molding 16. The seal lip 17 elastically contacts an upper stepped surface of the roof rail panel 11 to enhance the appearance around the peripheral portion of the panel portion 31. Also, in the first embodiment, the panel portion 31 of the resin roof panel 30 is formed as a plate-like shape having a three-dimensional curved surface such that the central portion of the upper surface is the highest and gradually becomes lower toward the peripheral portion.

Figure 4:
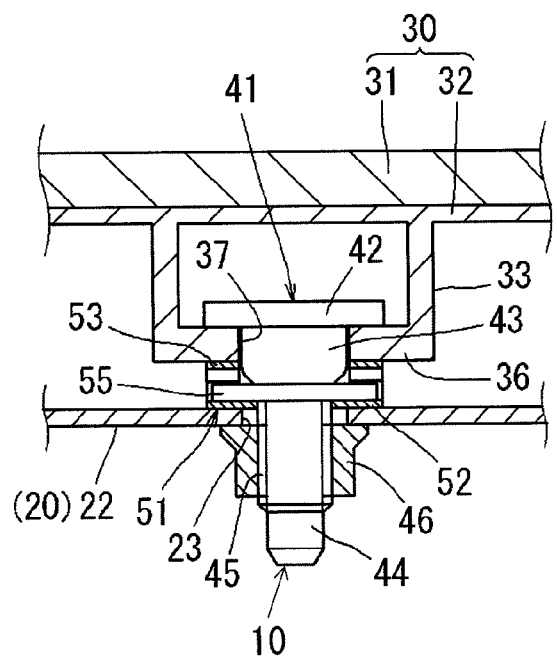
FIG. 4 A cross-sectional view taken along line 4-4 in FIG. 3.

As shown in FIGS. 2 and 3, coupling portions 33 are formed on the lower surface of the peripheral frame portion 32 of the rosin roof panel 30. The coupling portions 33 face the attaching portion 22 of the sunshade housing 20. The coupling portions 33 are formed on the lower surface of the peripheral frame portion 32 at appropriate intervals along the circumferential direction of the panel portion 31. Each coupling portion 33 is formed as a box-like shape that is open toward the central portion of the resin roof panel 30 as shown in FIGS. 3 and 4. An elongated hole 37, which extends toward the central portion of the resin roof panel 30, is formed in a coupling plate 36, which is a base plate of the coupling portion 33. The elongated holes 37 formed in the coupling portions 33 are arranged to extend in a radial pattern from the central portion of the resin roof panel 30. The elongated holes 37 may be formed as notches each of which has one end that is open toward the same direction as the opening of the coupling portion 33. Attaching holes 23 are formed through the attaching portion 22 of the sunshade housing 20 at positions corresponding to the elongated holes 37.

Figure 5:
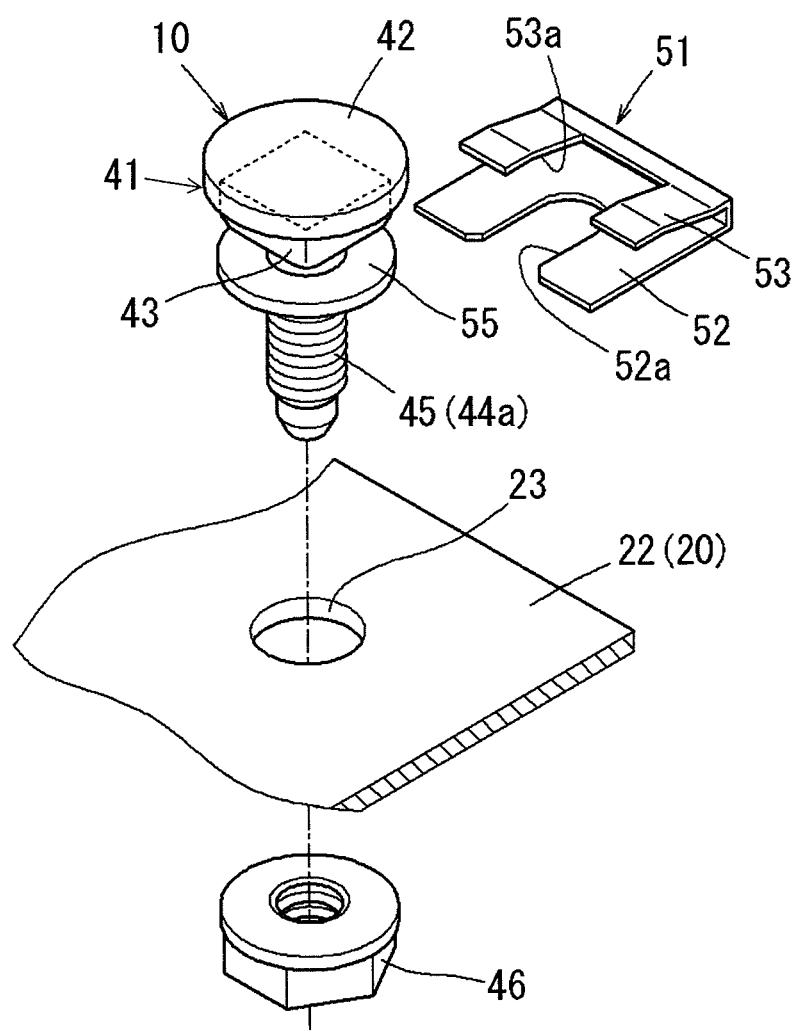
FIG. 5 A perspective view illustrating the fastening bolt and the plate spring.

In the first embodiment, a fastening bolt 41 and a nut 46 are used as the fastening member for fastening the attaching portion 22 of the sunshade housing 20 to each coupling portion 33 of the resin roof panel 30 as shown in FIGS. 3, 4, and 5. Each fastening bolt 41 includes a head 42, which includes a neck 43, and a shank 44. An external thread 45 is formed on the outer circumferential surface of the shank 44. The neck 43 is fitted to the elongated hole 37 of the associated coupling portion 33. The neck 43 is formed as a square shaft such that the fastening bolt 41 does not turn with respect to the associated coupling portion 33 when fitted in the elongated hole 37. A washer 53 is secured between the neck 43 and the shank 44 of each fastening bolt 41 by swaging. Each fastening bolt 41 is inserted in the corresponding attaching hole 23 of the attaching portion 22 of the sunshade housing 20 via the elongated hole 37 of the associated coupling portion 33 of the resin roof panel 3C as shown in FIG. 3. The nut 46 is then screwed to the external thread 45 of the shank 44.

As shown in FIG. 3, an elastic member, which is a plate spring 51 in the first embodiment, is arranged between the attaching portion 22 of the sunshade housing 20 and each coupling portion 33 of the resin roof panel 30. Each fastening bolt 41 and the associated plate spring 51 are combined to form a combined member 10. Each combined member 10 fastens the attaching portion 22 of the sunshade housing 20 and the associated coupling portion 33 of the resin roof panel 30 to each other. In a state where the attaching portion 22 and each coupling portion 33 are fastened together by the associated combined member 10, the combined member 10 permits the attaching portion 22 and the associated coupling portion 33 to be displaced relative to each other within a predetermined range along the axial direction of the associated fastening bolt 41 through elastic deformation of the associated plate spring 51 as described below.

In the first embodiment, each plate spring 51 is formed by bending a plate spring member into a folded state. One of the two folded parts forms a seat 52 and the other folded part forms a pressing part 53 as shown in FIG. 5. Also, a U-shaped insertion portion 52a is formed in the seat 52 such that the shank 44 is selectively inserted from the direction perpendicular to the axial direction of the shank 44 of the fastening bolt 41. Furthermore, a U-shaped insertion portion 53a is formed in the pressing part 53 such that the neck 43 is selectively inserted from the direction perpendicular to the axial direction of the square neck 43 of the fastening bolt 41. The insertion portion 53a has a shape that corresponds to the outer circumferential shape of the neck 43 so as not to turn with respect to the neck 43. In a state where each plate spring 51 is mounted on the associated fastening bolt 41 as shown in FIGS. 3 and 4 from the direction perpendicular to the axial direction, the seat 52 is arranged between the attaching portion 22 of the sunshade housing 20 and the washer 55 of the fastening bolt 41. That is, the seat 52 contacts the upper surface of the attaching portion 22, and the pressing part 53 is constantly pressed against the lower surface of the coupling plate 36 of the coupling portion 33.

According to the first embodiment, in the state where each plate spring 51 is mounted on the associated fastening bolt 41, the displacement amount of the pressing part 53 of the plate spring 51 along the axial direction is set in accordance with a clearance S between the pressing part 53 and the washer 55 as shown in FIG. 3. As shown by the line formed by a long dash alternating with two short dashes in FIG. 3, the resin roof panel 30 is selectively inclined in the range of the predetermined displacement amount (the dimension of the clearance S) through elastic deformation of the plate spring 51.

The fastening structure of a resin component according to the first embodiment is configured as described above. The resin roof panel 30 is therefore mounted on the window opening portion surrounded by the roof rail panel 11 as shown in FIG. 2. As shown in FIG. 3, the attaching portion 22 of the sunshade housing 20 and the coupling portions 33 of the resin roof panel 30 are fastened to each other by the combined members 10 each formed by the fastening bolt 41 and the plate spring 51. If the resin roof panel 30 causes thermal expansion and contraction, for example, if the resin roof panel 30 thermally expands in this state, the resin roof panel 30 deforms in such a manner that the central portion of the resin roof panel 30 displaces (bulges) upward as shown by the line formed by a long dash alternating with two short dashes in FIG. 3.

The displacement of the resin roof panel 30 in one direction (the direction toward the central portion), that is, the displacement along the plane parallel to the sunshade housing 20 due to thermal expansion is absorbed (permitted) by the elongated holes 37. In other words, each combined member 10 inserted it the associated elongated hole 37 permits the attaching portion 22 and the associated coupling portion 33 to be displaced relative to each other along the longitudinal direction of the elongated hole 37. Also, the displacement of the resin roof panel 30 in the inclination direction with respect to the plane parallel to the sunshade housing 20 is absorbed (permitted) through elastic deformation of each plate spring 51 within the clearance S. In other words, each combined member 10 permits the attaching portion 22 and the associated coupling portion 33 to be relatively displaced along the axial direction of the fastening bolt 41 within the range of the clearance S through elastic deformation of the plate spring 51. In this manner, stress caused by the thermal expansion and contraction of the resin roof panel 30 is prevented from being applied to the fastening portion (the attaching portion 22, the coupling portion 33, the fastening bolt 41, and the nut 46) between the metal component, which is the sunshade housing 20 in the first embodiment, and the resin component, which is the resin roof panel 30 in the first embodiment by absorbing (permitting) the displacement of the resin roof panel 30 in several directions due to thermal expansion and contraction. This prevents damage to the fastening portion, in particular, the coupling portions 33 of the resin roof panel 30.

Also, in the state where the attaching portion 22 of the sunshade housing 20 and the coupling portions 33 of the resin roof panel 30 are fastened by the combined members 10, relative displacement between the sunshade housing 20 and the resin roof panel 30 in the axial direction of the fastening bolt 41 is prevented by the elastic force of each plate spring 51. Thus, the sunshade housing 20 and the resin roof panel 30 are held fastened in a stable manner, and generation of noise due to displacement is prevented.

It is significantly advantageous to apply the fastening structure of the first embodiment to a fastening structure of the resin roof panel 30 having a three-dimensional curved surface that is easily displaced in the inclination direction due to thermal expansion and contraction. That is, the fastening bolts 41 are used as the fastening members. Each fastening bolt 41 is inserted in the associated attaching hole 23 of the attaching portion 22 of the sunshade housing 20 via the elongated hole 37 of the associated coupling portion 33 of the resin roof panel 30. Then, each nut 46 is fastened to the associated external thread 45. In this manner, the sunshade housing 20 is easily fastened to the resin roof panel 30.

Also, the square neck 43 of each fastening bolt 41 is inserted in the elongated hole 37 of the associated coupling portion 33 of the resin root panel 30 so as not to turn with respect to the coupling portion 33. This facilitates fastening each nut 46 to the external thread 45 of the associated fastening bolt 41. Furthermore, the dimension of the elastic member, which is the plate spring 51 in this embodiment, is easily shortened in the axial direction as compared to the coil spring. The plate spring 51 is therefore easily arranged in the limited space between the attaching portion 22 of the sunshade housing 20 and the associated coupling portion 33 of the resin roof panel 30. Also, the insertion portion 53a formed in the pressing part 53 of each plate spring 51 is inserted in the neck 43 of the associated fastening bolt 41 so as not to turn with respect to the neck 43. This prevents the plate spring 51 from being undesirably rotated about the axis of the fastening bolt 41. Accordingly, the pressing part 53 of each plate spring 51 is constantly pressed against the lower surface of the coupling plate 36 of the associated coupling portion 33 of the resin roof panel 30 in a certain posture and with a stable pressure.

Figure 6:
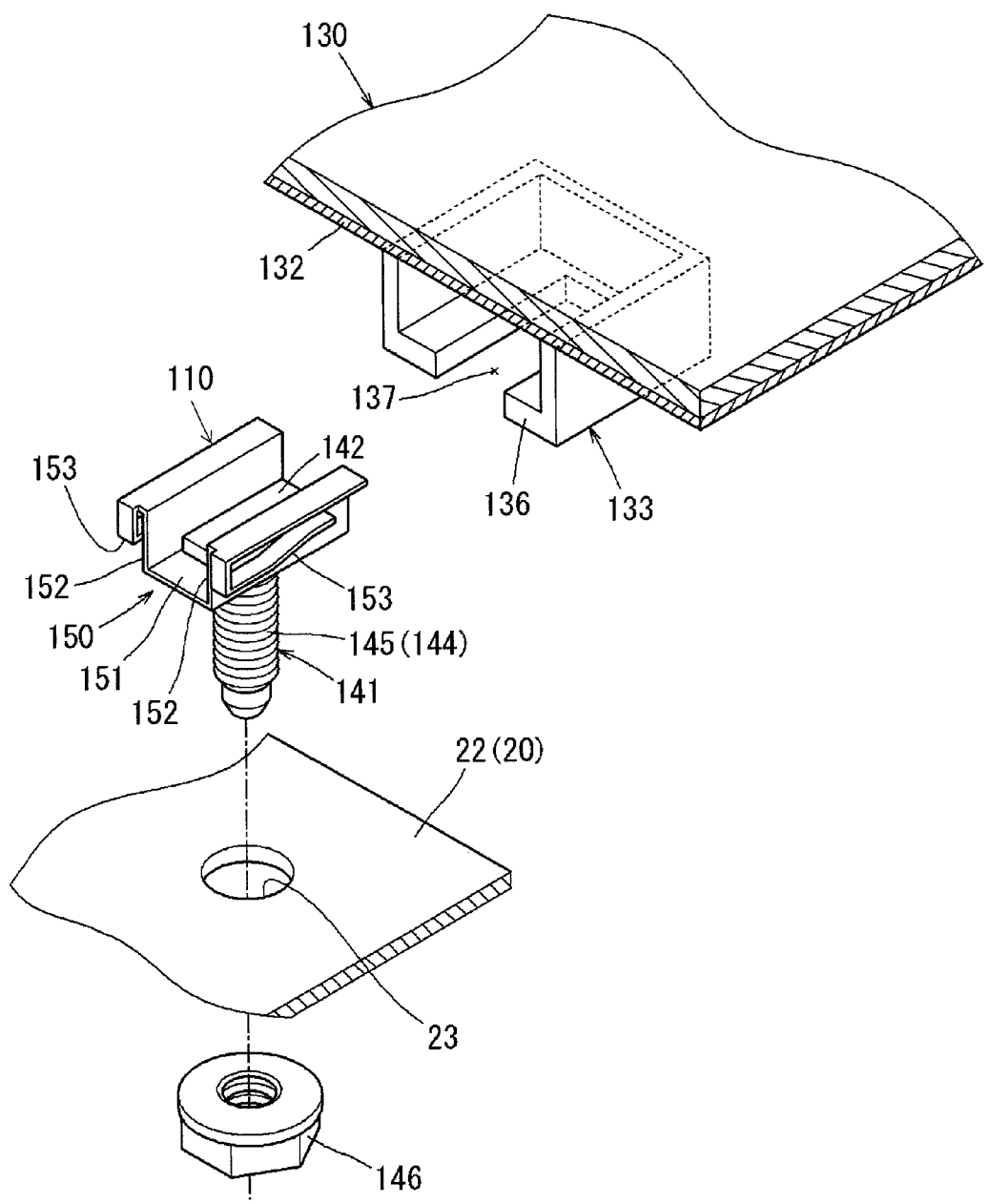
FIG. 6 A perspective view illustrating a fastening structure according to a second embodiment of the present invention.
Figure 7:
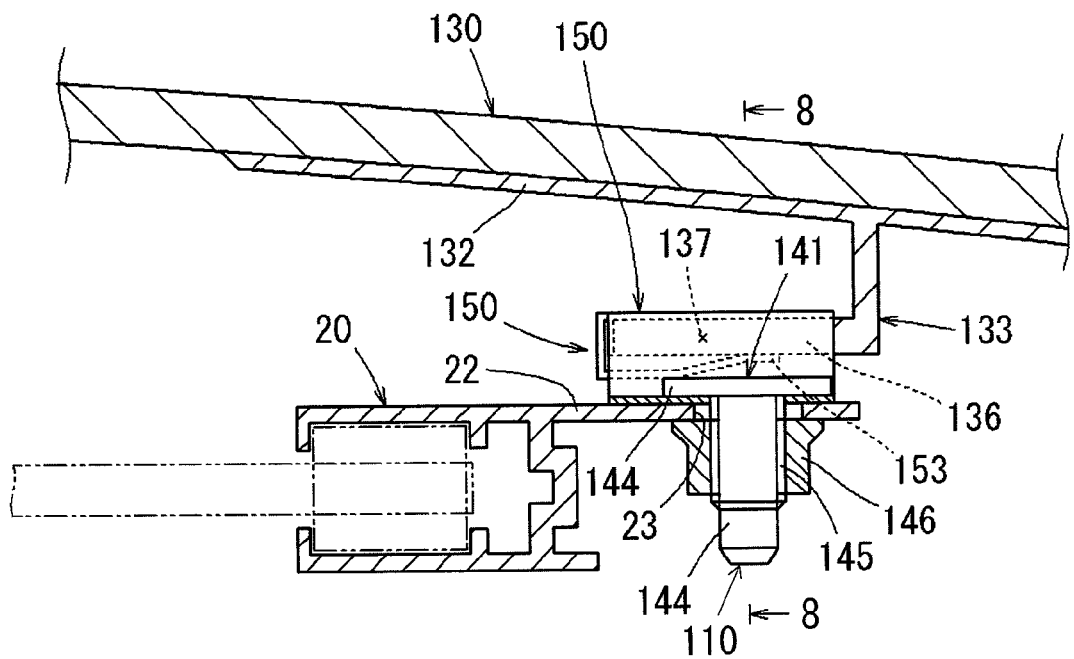
FIG. 7 A cross-sectional view illustrating the fastening structure according to the second embodiment.
Figure 8:
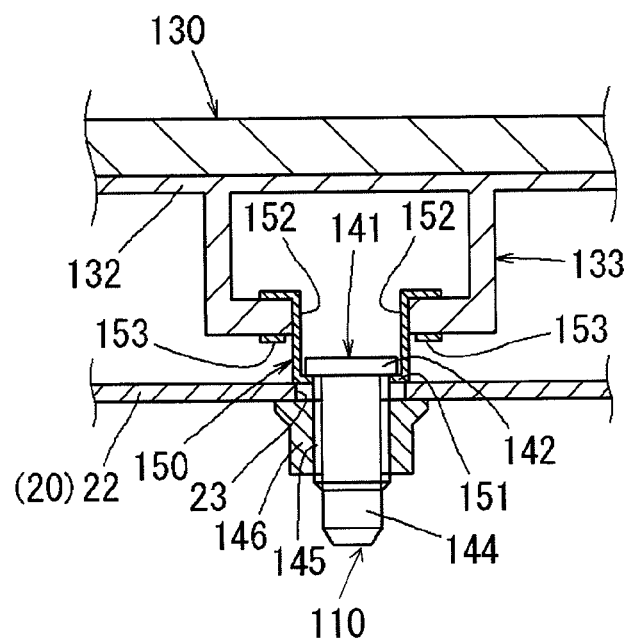
FIG. 8 A cross-sectional view taken along line 8-8 in FIG. 7.

A fastening structure of a resin component according to a second embodiment of the present invention will now be described with reference to FIGS. 6 to 8. In the second embodiment, the structure of coupling portions 133 of a resin roof panel 130, a fastening member, and an elastic member is modified as shown in FIGS. 6 to 8. That is, in the second embodiment, the coupling portions 133 are formed on the lower surface of a peripheral frame portion 132 of the resin roof panel 130 at appropriate intervals along the circumferential direction of the panel portion 31. The coupling portions 133 are located above the attaching portion 22 of the sunshade 20 formed in the same manner as the first embodiment to face the attaching portion 22.

Each coupling portion 133 is formed as a box-like shape that is open toward the central portion of the resin roof panel 130 as shown in FIGS. 6 to 8. An elongated hole 137, which extends toward the central portion of the resin roof panel 130, is formed in a coupling plate 136, which is a base plate of the coupling portion 133. In the second embodiment, the elongated hole 137 is formed as a notch one end of which is open toward the same direction as the opening of the coupling portion 133.

As shown in FIGS. 6 to 8, elastic members 150 are each formed by a plate spring member. Each elastic member 150 includes a seat 151, a pair of side plates 152, and a pair of holding portions 153. The side plates 152 are formed by folding the side edges of the seat 151 upward at a right angle. Also, the side plates 152 are formed such that the elastic member 150 is selectively fitted in the elongated hole 137 of the associated coupling portion 133, and the elastic member 150 does not turn with respect to the coupling portion 133 in the elongated hole 137. The holding portions 153 each extend outward from the corresponding side plate 152, and are bent into a folded state. The holding portions 153 are elastically deformable so as to hold the coupling plate 136 of the associated coupling portion 133. A shank 144 of a fastening bolt 141 forming the fastening member is inserted from the above of the center portion of the seat 151 and extends downward. A head 142 of the fastening bolt 141 is secured to the upper surface of the seat 151 by welding. As described above, the fastening bolt 141 and the elastic member 150 are combined to form a combined member 110.

With the fastening bolt 141 being secured to the seat 151, the side plates 152 are inserted in the elongated hole 137 such that the holding portions 153 of the elastic member 150 sandwich the coupling plate 136 of the coupling portion 133. In this state, the shank 144 of the fastening bolt 141 is inserted in the associated attaching hole 23 of the attaching portion 22 of the sunshade housing 20. A nut 146 forming the fastening member is then screwed to an external thread 145 of the shank 144. Each elastic member 150 also functions as a fastening member for fastening the associated coupling portion 133 with the attaching portion 22. The combined members 110 fasten the sunshade housing 20 and the resin roof panel 130 with each other.

The fastening structure according to the second embodiment is configured as described above. Therefore, in the second embodiment, the displacement of the resin roof panel 130 in one direction (the direction toward the central portion), that is, the displacement along the plane parallel to the sunshade housing 20 due to thermal expansion is absorbed (permitted) by the elongated holes 137. In other words, each combined member 110 inserted in the associated elongated hole 137 permits the attaching portion 22 and the associated coupling portion 133 to be relatively displaced along the longitudinal direction of the elongated hole 137. Also, the displacement of the resin roof panel 130 in the inclination direction with respect to the plane parallel to the sunshade housing 20 is absorbed (permitted) through elastic deformation of the holding portions 153 of each elastic member 150. In other words, each combined member 110 permits the attaching portion 22 and the associated coupling portion 133 to be relatively displaced along the axial direction of the associated fastening bolt 141 through elastic deformation of the associated elastic member 150. In this manner, stress caused by thermal expansion and contraction of the resin roof panel 130 is inhibited from being applied to the metal component, which is the sunshade housing 20 in the second embodiment, the resin component, which is the resin roof panel 130 in the second embodiment, and the fastening portion (the attaching portion 22, the coupling portion 133, the fastening bolt 141, and the nut 146) by absorbing (permitting) the displacement of the resin roof panel 130 in several directions due to thermal expansion and contraction. This prevents damage to the fastening portion, in particular, the coupling portions 133 of the resin roof panel 130.

Figure 9:
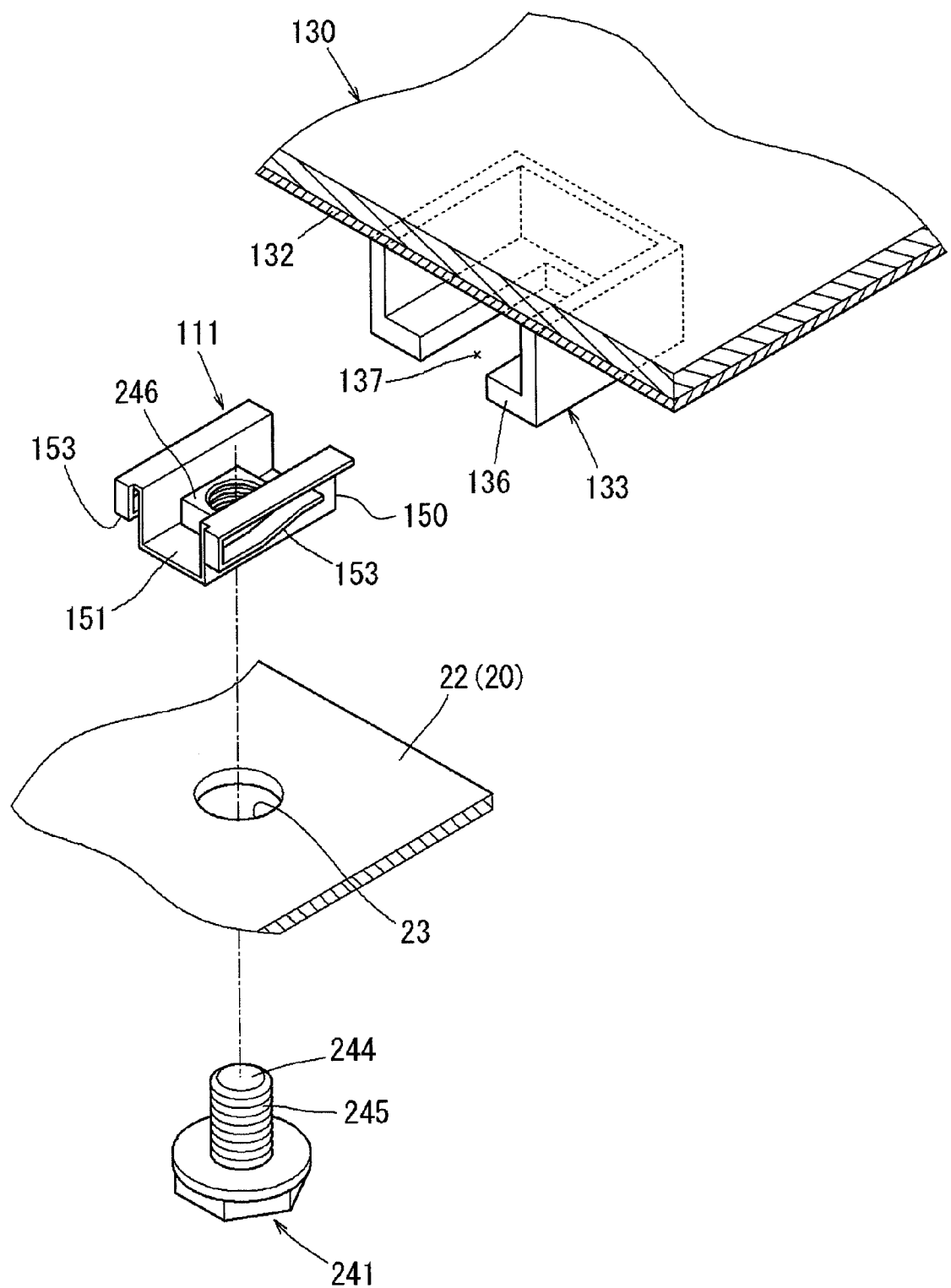
FIG. 9 A perspective view illustrating a fastening structure according to a third embodiment of the present invention.
Figure 10:
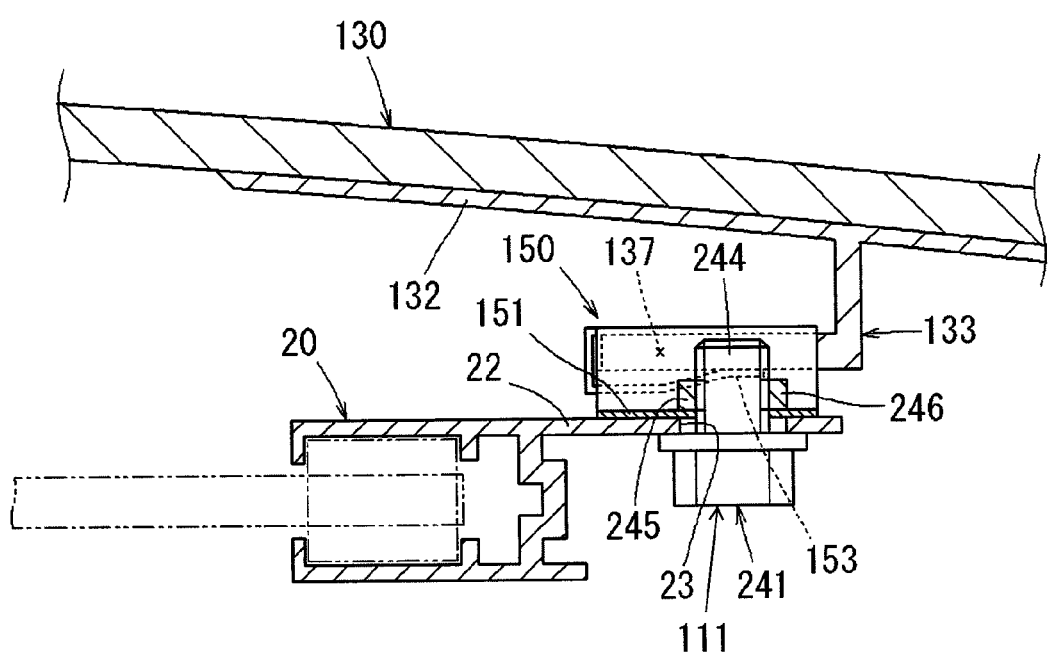
FIG. 10 A cross-sectional view illustrating the fastening structure of the third embodiment.

A fastening structure according to a third embodiment of the present invention will now be described with reference to FIGS. 9 and 10. In the third embodiment, a nut 246 forming the fastening member is secured by welding on the upper surface of the center portion of the seat 151 of each elastic member 150 formed in the same manner as the second embodiment, as shown in FIGS. 9 and 10.

An external thread 245 of a shank 244 of a fastening bolt 241 forming the fastening member is screwed to the nut 246 of each elastic member 150 from below the attaching portion 22 of the sunshade housing 20 through the associated attaching hole 23 so that the resin roof panel 130 is fastened to the sunshade housing 20. Each elastic member 150 and the associated fastening bolt 241 form a combined member 111. In the third embodiment, the structure other than that described above is the same as in the second embodiment, and explanation thereof is omitted.

The fastening structure according to the third embodiment is configured as described above. Thus, the third embodiment also has the same advantages as the second embodiment. That is, the displacement of the resin roof panel 130 in one direction (the direction toward the central portion), that is, the displacement along the plane parallel to the sunshade housing 20 due to thermal expansion is absorbed (permitted) by the elongated holes 137. Also, the displacement of the resin roof panel 130 in the inclination direction with respect to the plane parallel to the sunshade housing 20 is absorbed (permitted) through elastic deformation of the holding portions 153 of the elastic members 150.

Figure 11:
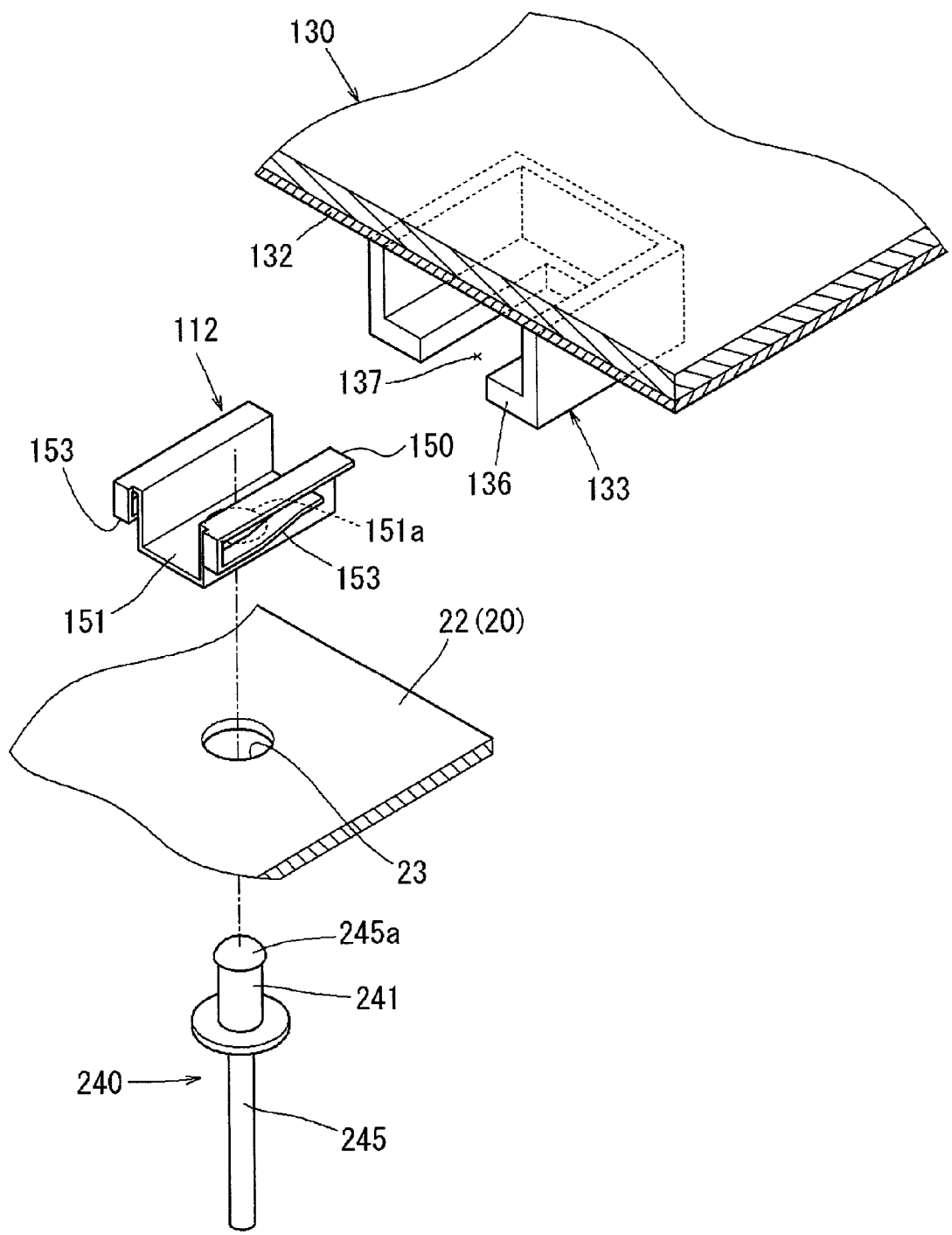
FIG. 11 A perspective view illustrating a fastening structure according to a fourth embodiment of the present invention.
Figure 12:
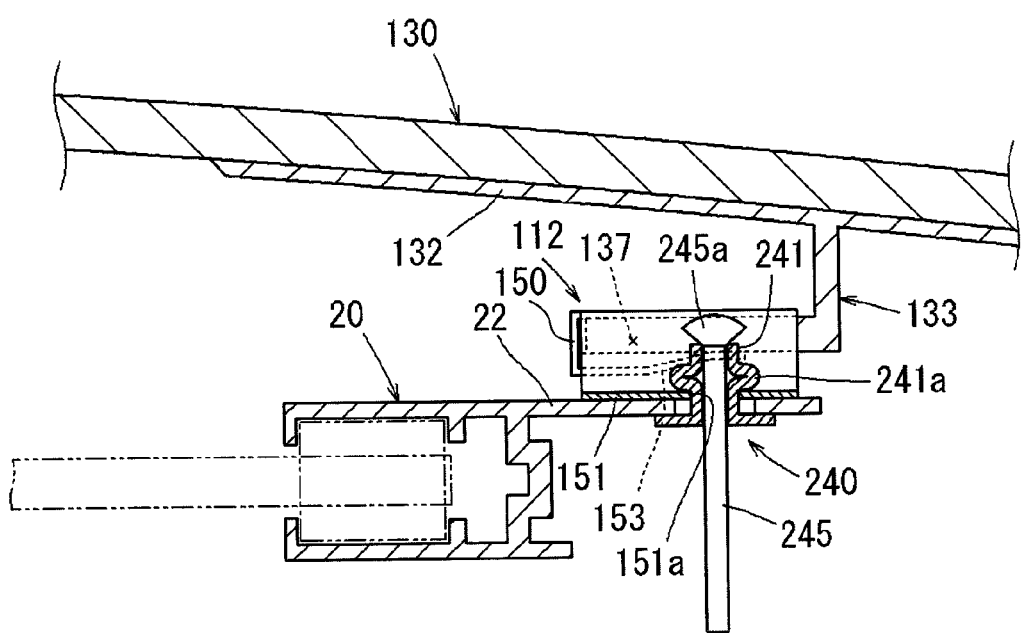
FIG. 12 A cross-sectional view illustrating the fastening structure of the fourth embodiment.

A fastening structure according to a fourth embodiment of the present invention will now be described with reference to FIGS. 11 and 12. In the fourth embodiment, a through hole 151a is formed in the center portion of the seat 151 of each elastic member 150 formed in the same manner as the second embodiment. A swaging rivet 240 is also used as the fastening member. Each elastic member 150 and the associated swaging rivet 240 form a combined member 112. The swaging rivet 240 includes a hollow rivet body 241 having a flange on one axial end, and a swaging pin 245, which is inserted in the central bore of the rivet body 241 from the other axial end of the rivet body 241. The swaging pin 245 includes a head portion 245a. Each swaging rivet 240 is inserted in the through hole 151a of the associated elastic member 150 from below the associated attaching hole 23 of the attaching portion 22 of the sunshade housing 20 through the attaching hole 23. In this state, the lower end of the swaging pin body 245 is pulled by a predetermined tensile force to forcibly pull down the head portion 245a of the pin body 245. Accordingly, the rivet body 241 is deformed in the direction expanding the diameter between the seat 151 and the head portion 245a. A swaging portion 241a the diameter of which is greater than the through hole 151a is then formed on the rivet body 241. Thus, the swaging portion 241a and the flange of the rivet body 241 sandwich (secure by swaging) the seat 151 and the attaching portion 22. As a result, the resin roof panel 130 is fastened to the sunshade housing 20. In the fourth embodiment, the structure other than that described above is the same as in the second embodiment, and explanation thereof is omitted.

The fastening structure according to the fourth embodiment is configured as described above. Therefore, the fourth embodiment also has the same advantages as the second embodiment. That is, the displacement of the resin roof panel 130 due to thermal expansion in one direction the direction toward the central portion) is absorbed by the elongated holes 137. Also, the displacement of the resin roof panel 130 in the inclination direction with respect to the plane parallel to the sunshade housing 20 is absorbed (permitted) through elastic deformation of the holding portions 153 of the elastic members 150.

The present invention is not limited to the first to fourth embodiments, but may be embodied in many other specific forms without departing from the spirit or scope of the invention. For example, in the first to fourth embodiments, the metal component corresponds to the sunshade housing 20, and the resin component corresponds to the resin roof panels 30, 130. However, the present invention may also be embodied in a case where the metal component corresponds to a metal panel forming, for example, the vehicle body and the door, and the resin component corresponds to, for example, a bumper, a spoiler, a side molding, and a door protector molding. When the resin component has an elongated shape, stress applied to the fastening portion between the metal component and the resin component is inhibited and damage caused on the fastening portion is prevented by employing the fastening structure of the present invention on both longitudinal ends of the resin component. The elastic member does not need to be a plate spring, but may be an elastic body such as a coil spring, a soft resin, or a rubber. The elongated holes do not need to be formed on the coupling portions of the resin component, but may be formed on the attaching portion of the metal component.

DESCRIPTION OF THE REFERENCE NUMERALS 10, 110, 111, 112 . . . Combined member, 20 . . . Sunshade housing (Metal component), 22 . . . Attaching portion, 23 . . . Attaching holes, 30, 130 . . . Resin roof panel (Resin component), 33, 133 . . . Coupling portions, 37, 137 . . . Elongated holes, 41, 141, 240 . . . Fastening bolts (Fastening member), 46, 146, 246 . . . Nuts (Fastening member), 51, 150 . . . Plate springs (Elastic member).

The invention claimed is:

1. A fastening structure, comprising:

a metal component comprising a flange having a hole disposed therein, the flange projecting from the metal component;

a resin component comprising a coupling portion with an elongated hole formed therein, the coupling portion projecting from the resin component and being disposed in alignment with the flange; and a combined member comprising a fastening member and an elastic member, wherein the fastening member comprises:

a fastening bolt having a head, a square neck extending from the head, and a shank, wherein a washer is secured between the neck and shank; and a nut configured to be screwed onto the shank of the fastening bolt; and wherein the elastic member comprises a plate spring folded to form a seat having a top surface configured to engage a lower surface of the washer and a bottom surface configured to engage the flange with a first U-shaped slot formed therein, the first U-shaped slot being shaped and configured to engage the shank of the fastening bolt; and a resilient pressing part attached to the seat and having a second U-shaped slot formed therein, the second U-shaped slot being shaped and configured to engage the square neck of the fastening bolt and prevent rotation thereof, wherein the combined member fastens the metal component to the resin component by inserting the shank of the fastening bolt into the hole in the flange and inserting the neck of the fastening bolt through the elongated hole formed in the coupling portion such that the seat is disposed between the flange and the washer and the pressing part is disposed between the coupling portion and the washer and applies a spring clamping force onto the coupling portion to clamp the head of the fastening bolt against the coupling portion, and screwing the nut onto the fastening bolt, and wherein the combined member permits relative displacement of the flange and the coupling portion along a longitudinal direction of the elongated hole, permits relative displacement of the flange and the coupling portion within a predetermined range along an axial direction of the fastening member through elastic deformation of the elastic member, and absorbs displacement of the resin component with respect to the metal component due to thermal expansion and contraction of the resin component.

2. The fastening structure according to claim 1, wherein the resin component is a plate having a three-dimensional curved surface;

wherein the coupling portion is one of a plurality of coupling portions arranged in the vicinity of a peripheral portion of one of the surfaces of the resin component; and wherein the elongated hole is formed in each of the coupling portions such that the elongated holes extend in a radial pattern about a central portion of the resin component.

* * * * *